United States Patent [19]

Liang

[11] Patent Number: 4,563,509
[45] Date of Patent: Jan. 7, 1986

[54] THERMOSET POLYMER PRODUCTION

[75] Inventor: Yeon F. Liang, Tulsa, Okla.

[73] Assignee: Phillips Petroleum Company, Bartlesville, Okla.

[21] Appl. No.: 636,775

[22] Filed: Aug. 1, 1984

[51] Int. Cl.$^4$ ............................................. C08F 283/00
[52] U.S. Cl. ..................................... 525/537; 528/388
[58] Field of Search ......................... 525/537; 528/388

[56] References Cited

U.S. PATENT DOCUMENTS

| | | | |
|---|---|---|---|
| 3,354,129 | 11/1967 | Edmonds et al. | 260/79 |
| 3,948,865 | 4/1976 | Brady | 260/79 |
| 4,251,575 | 2/1981 | Brady et al. | 427/341 |

Primary Examiner—Melvyn I. Marquis
Attorney, Agent, or Firm—Howard D. Doescher

[57] ABSTRACT

Poly(phenylene sulfide) (PPS) copolymers and terpolymers can be made infusible or thermoset by first treating with hydrogen peroxide followed by heating above the melting temperature of the polymers.

8 Claims, No Drawings

THERMOSET POLYMER PRODUCTION

This invention relates to the treatment of polymers to change the physical characteristics and to extend the limits of usage of the polymer. In another aspect, this invention relates to a process for treating polymers with hydrogen peroxide followed by heat treatment of the polymer. In a further aspect, this invention relates to the production of thermoset copolymers and terpolymers of poly(phenylene sulfide).

Polymers of arylene sulfides generally have relatively high melt flow and have to be precured in order to make products in some applications. The extent of cure and the final melt flow which is obtained depends upon the intended use of the polymer. It should be noted that the term "curing", with respect to arylene sulfide polymers, is not necessarily synonymous with the meaning of that term when applied to other polymers. The curing of poly(arylene sulfide) resins differs from other polymers in that these polymers are thermoplastic both before and after curing although not necessarily to the same degree.

Arylene sulfide polymers are well known in the art to be thermoplastic in nature and are useful in such areas as electrical components, protective coatings, automotive parts, etc.

To extend the value of poly(arylene sulfide) resins and the utility of the product prepared therefrom still further improvements have been sought with regard to treatment of these polymers to further improve the properties and meet requirements of certain applications. In some applications it is desirable to have an infusible or thermoset polymer. The present invention is directed to the production of such thermoset polymers.

Accordingly, an object of this invention is to provide a process for improving the properties of arylene sulfide copolymers and terpolymers.

It is a further object of this invention to provide a process for treating thermoplastic polymers and convert these polymers to thermoset polymers.

Another object of this invention is to produce thermoset polymers having desirable physical properties.

Other aspects, objects and the several advantages of this invention are apparent from a study of the disclosure and the appended claims.

This invention pertains to the preparation of thermoset copolymers and terpolymers of poly(phenylene sulfide) by treating thermoplastic copolymers and terpolymers of poly(phenylene sulfide) with hydrogen peroxide followed by heat treatment at a temperature above the melting point of the polymers to form thermoset polymers.

More specifically, poly(phenylene sulfide), also known as PPS, copolymers and terpolymers in which some of the dihalobenzene, e.g. p-dichlorobenzene, has been replaced with substituted dihalobenzenes can be made infusible or thermoset by first treating with hydrogen peroxide following by heating above its melting temperature. PPS containing only p-dichlorobenzene does not yield a thermosetting material with the same treatment.

In accordance with the invention, it has been found that the crosslinkability of PPS copolymers and terpolymers is improved by pretreating these polymers with hydrogen peroxide followed by heat treating above the melting point of the polymers.

For example, a PPS copolymer formed from 1,4-dichlorobenzene and 2,5-dichloroaniline pretreated with boiling aqueous hydrogen peroxide and then heated above its melt temperature yields a product which is no longer thermoplastic but is now thermosetting as evidenced by loss of melt temperature. By comparison, PPS homopolymers do not exhibit this loss of melt temperature when subjected to the same pretreatment.

The term "poly(phenylene sulfide), also known as PPS, copolymers and terpolymers" as used in this specification is intended to include polymers formed from at least two different comonomers wherein one of the monomers is a dihalobenzene such as 1,4-dichlorobenzene as the major monomer and a minor amount of at least one other comonomer, such as any polyhalo aromatic compound such as dichloro or trichloro aromatic compound. Suitable comonomers that can be used include:

2,4-dichlorotoluene
m-dichlorobenzene
o-dichlorobenzene
2,5-dichloro-p-xylene
2,4-dichloroaniline
2,5-dichloroaniline
2,4-dichlorobenzoic acid
2,5-dichlorobenzoic acid
2,5-dichlorophenol
2,4-dichlorophenol
2,5-dichlorotoluene and the like, and mixtures thereof. The instant polymers can be prepared by reacting a mixture of comonomers with an alkali metal sulfide in a polar organic compound. Such resins can be conveniently prepared by the process disclosed in U.S. Pat. No. 3,354,129 to Edmonds et al.

The copolymers and terpolymers of the invention are treated with an aqueous hydrogen peroxide. The hydrogen peroxide can be dissolved in a glacial acetic acid, water or mixtures thereof. It is employed at a concentration ranging from about 0.5 weight percent of the solution up to a saturated solution. Preferably the concentration is from 2 to 30 weight percent.

The concentration of the hydrogen peroxide treating agent in the treating fluid, the time of treatment and the temperature of treatment can vary appreciably. Generally, it is preferred to contact the copolymers and terpolymers of the invention with boiling aqueous hydrogen peroxide. Generally, the treatment time will range from about 15 minutes to about 2 hours and the temperature will range from about 50° C. to about 120° C.

The contact of the hydrogen peroxide treating fluid with the copolymers and terpolymers of the invention can be carried out in any suitable manner, such as immersion in a liquid phase, spraying with hydrogen peroxide fluid, dipping polymer in aqueous hydrogen peroxide or other contact using any suitable apparatus. The process can be carried out batchwise or in a continuous fashion.

The quantity of treating hydrogen peroxide fluid with respect to the quantity of polymer being treated can vary appreciably. If desired, a measured amount of hydrogen peroxide can be contacted with a measured amount of material to be treated such as in a batch operation. Alternatively, the material to be treated can be continuously contacted with a large excess of hydrogen peroxide under conditions which are suitable to obtain the desired improvements.

After sufficient contact of the co-polymer or terpolymer with the hydrogen peroxide treating fluid, the hydrogen peroxide is removed by any suitable separation procedure. For example, liquid treating fluid can be separated from the resin by filtration, centrifuging, decantation, etc. It is generally advisable to wash the resin with a suitable wash liquid, such as water followed by drying.

Following treatment of the copolymers and terpolymers of the invention with hydrogen peroxide and removal of excess treating agent, the polymer is subjected to a moderate heat treatment at a temperature not appreciably above the melting point of the polymer under conditions and for a period of time sufficient to cause cross-linking and form a thermoset resinous product. The heat treatment can be carried out at temperatures just above the melting point of the polymer, for example, about 20° to 30° C. above the melting point of the polymer, generally not more than about 50° C. above the melting point of the polymer. The heat treatment can be carried out in a single stage or in plural stages with heat in each subsequent stage being at a higher temperature or the same or even lower temperatures. The length of time for heat treating above the melting point of the polymer will ordinarily range from about a few seconds to about 30 minutes.

The heating, according to the invention, can be carried out in conventional equipment. The heating can be carried out under atmospheric conditions or in the presence of an inert gas, such as nitrogen.

The invention is a 2-step process for converting thermoplastic PPS copolymers and terpolymers into thermosetting PPS copolymer and terpolymer products. The first step involves a hot (or refluxing) aqueous hydrogen peroxide treatment followed by the second step of a heat treatment above the melting point of the polymer. This melt process is important since crosslinking occurs only after melting. Other types of crosslinking are not satisfactory at this point, only the melt crosslinking as disclosed herein.

The advantage of using thermosetting PPS polymers is that after the first oxidizing step the product is processed similar to normal PPS thermoplastics since it still has a melting point and has not yet crosslinked. Extrusion, compression molding, etc. above the melting point causes the thermosetting product to form. The difference being that once the melt heat treatment has been made the product can no longer be recycled as can thermoplastics.

Thermosetting materials are known for their good thermal and chemical resistance and are commonly used in such application areas as coatings, sealants and adhesives. The products prepared according to the instant invention also can be used for molded articles since the polymers can be injection and compression molded.

The following are intended to illustrate the process of the invention.

EXAMPLE I

This example illustrates the inventive feature of converting a normally thermoplastic poly(phenylene sulfide), (PPS), copolymer into a thermosetting copolymer by treating the copolymer with a hot aqueous oxidizing agent followed by a heat treatment above the melting point of the copolymer. To a 250 milliliter round bottomed flask equipped with a magnetic stirrer and reflux condenser were added 27 grams (0.25 mole equivalents) of a PPS copolymer (flow rate 294 grams/10 minutes using a 5 kilogram weight at 316° C. according to ASTM D 1238, Procedure B, prepared from 92.5 weight percent p-dichlorobenzene and 7.5 weight percent 2,5-dichloroaniline), 75 milliliters of glacial acetic acid and 14.3 grams (0.125 mole) of 30 percent aqueous hydrogen peroxide. The mixture was heated and stirred at reflux for one hour, cooled, filtered, the residual polymer washed with distilled water and vacuum dried to give 26 grams of oxidized product.

A portion of this product, 10 milligrams was placed in a DuPont Differential Thermal Analyzer (DTA), Model 900 containing a Differential Scanning Colorimeter cell and slowly heated at 20° C./minute under a nitrogen atmosphere from about room temperature to about 20 or 30 degrees above its melting point (Tm) which was 270° C. The material was then cooled to about room temperature and the heating process repeated. This time the oxidized PPS copolymer did not melt at 270° C. but continued to be heated until it decomposed at 355° C.

Another sample of the PPS copolymer that had not been treated with boiling aqueous hydrogen peroxide was subjected to the DTA heat treatment. The sample melting at 275° C. during the first heat-up. Upon heating the second time the sample exhibited a slightly higher melting point at 280° C. Continuing to heat the unoxidized product showed no decomposition point up to 410° C. Thus, these two experiments illustrated that a thermoplastic PPS copolymer can be made thermosetting by a 2-step process whereby the copolymer is first treated with hot aqueous hydrogen peroxide followed by heating above its melting point.

EXAMPLE II

This example illustrates that the hydrogen peroxide/heat treatment described in Example I to convert PPS copolymer from thermoplastic to thermosetting is selective to the copolymer and does not apply to PPS homopolymers. Two types of PPS homopolymers were evaluated to demonstrate this feature. For example, PPS Type V-1 homopolymer (flow rate 3000–8000 grams/10 minutes measured according to ASTM D 1238, Procedure B using a 5 kilogram weight at 316° C.) exhibited a Tm of 280° C. during the first heat-up and 278° C. during the second heat-up. Treating the homopolymer with refluxing 30 percent aqueous hydrogen peroxide gave a product that continued to be thermoplastic by exhibiting a Tm of 275° C. after the first heat-up and 265° C. after the second heat-up.

Another PPS homopolymer Type FS-5 (flow rate 750 to 950 grams/10 minutes) was evaluated. This homopolymer had a Tm of 275° C. after the first heat-up and 270° C. after the second heat-up. Treating the homopolymer with refluxing aqueous hydrogen peroxide gave a product that had a Tm of 275° C. after the first heat-up and 255° C. after the second heat-up again illustrating the ineffectiveness of the hydrogen peroxide/heat treatment technique to convert thermoplastic PPS homopolymer to a thermosetting polymer. These results along with those from Example I are listed in Table I for comparison. It is interesting to note that the Tm decreased for the homopolymers when subjected to the peroxide/heat treatment. Likewise, it is noteworthy that both homo- and copolymers when subjected to the peroxide/heat treatment all had decomposition temperatures below 400° C. whereas the polymers not subjected to the peroxide treatment but only heat treated all had decomposition temperatures above 400° C.

to cause crosslinking and form a thermoset polymeric product.

TABLE I

Effect of $H_2O_2$/Heat Treatment on Crosslinking PPS Homo- and Copolymers

| Example | PPS Monomer | Flow Rate,[a] g/10 min | Eq[b] $H_2O_2$ | Differential Thermal Analysis, °C. | | |
|---|---|---|---|---|---|---|
| | | | | $Tm_1$[c] | $Tm_2$[d] | Tdec[e] |
| Homopolymers: | | | | | | |
| II. | 100% p-Dichlorobenzene | 3,000–8,000 | — | 280 | 278 | >410 |
| II. | 100% p-Dichlorobenzene | 3,000–8,000 | 0.5 | 275 | 265 | 385 |
| II. | 100% p-Dichlorobenzene | 750–950 | — | 275 | 270 | >400 |
| II. | 100% p-Dichlorobenzene | 750–950 | 0.5 | 275 | 255 | 360 |
| Copolymer: | | | | | | |
| I. | 92.5% p-Dichlorobenzene 7.5% 2,5-Dichloroaniline | 294 | — | 275 | 280 | >410 |
| I. | 92.5% p-Dichlorobenzene 7.5% 2,5-Dichloroaniline | 294 | 0.5 | 270 | none | 355 |

[a]Flow rate in g/10 min. using a 5 Kg weight at 316° C. according to test method ASTM D 1238, Procedure B.
[b]Equivalents of $H_2O_2$ Used 30% aq. $H_2O$.
[c]Melt temp., °C. after first pass through DTA.
[d]Melt temp., °C. after second pass through DTA.
[e]Decomposition temp.

That which is claimed is:

1. A process for converting thermoplastic arylene sulfide resins to thermosetting resins which comprises:
   (1) contacting a thermoplastic poly(phenylene sulfide) resin with hot aqueous hydrogen peroxide at an elevated temperature which is below the melting point of the polymer, said thermoplastic resin consisting essentially of polymers formed by reacting at least two different comonomers wherein one of the monomers is a major amount of a dihalobenzene and the other monomer is a minor amount of at least one other polyhalo aromatic compound with an alkali metal sulfide in a polar organic compound, and
   (2) heat treating the hydrogen peroxide contacted polymer at a temperature above the melting point but not more than about 50° C. above the melting point of the polymer for a period of time sufficient to cause crosslinking and form a thermoset polymeric product.

2. A process according to claim 1 wherein said dihalobenzene is 1,4-dichlorobenzene.

3. A process according to claim 2 wherein said other comonomer is an aniline-containing comonomer.

4. A process according to claim 1 wherein said heat treating is carried out at a temperature in the range of about 20° to about 30° C. above the melting point of the polymer.

5. A process according to claim 1 wherein said heat treating is carried out in an inert atmosphere comprising nitrogen.

6. A process according to claim 1 wherein said copolymer or terpolymer is contacted with aqueous hydrogen peroxide in admixture with glacial acetic acid and the contacting is effected at reflux conditions.

7. A process according to claim 1 wherein said monomer is p-dichlorobenzene and said other comonomer is 2,5-dichloroaniline.

8. The thermoset product formed according to claim 1.

* * * * *